(12) United States Patent
Raeis Hosseiny et al.

(10) Patent No.: US 11,537,120 B2
(45) Date of Patent: Dec. 27, 2022

(54) SYSTEMS AND METHODS FOR PROVIDING ENHANCED FEEDBACK ON A PERSONAL COMMUNICATION DEVICE USED FOR VEHICLE MANEUVERING

(71) Applicant: Ford Global Technologies, LLC, Dearborn, MI (US)

(72) Inventors: Seyed Armin Raeis Hosseiny, Canton, MI (US); Bob Bao, Bloomfield, MI (US); Erick Lavoie, Van Buren Charter Township, MI (US); Hemanth Yadav Aradhyula, Dearborn, MI (US); Siyuan Ma, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 158 days.

(21) Appl. No.: 16/950,524

(22) Filed: Nov. 17, 2020

(65) Prior Publication Data
US 2022/0155778 A1    May 19, 2022

(51) Int. Cl.
*G05D 1/00* (2006.01)
*G08B 6/00* (2006.01)
(Continued)

(52) U.S. Cl.
CPC ......... *G05D 1/0016* (2013.01); *G05D 1/0022* (2013.01); *G05D 1/0044* (2013.01);
(Continued)

(58) Field of Classification Search
CPC .. G05D 1/0016; G05D 1/0022; G05D 1/0044; H04M 1/72415; G06F 3/04817; G06F 3/04883; G08B 6/00
See application file for complete search history.

(56) References Cited

U.S. PATENT DOCUMENTS 9,827,811 B1 * 11/2017 McNew .................. B60N 2/90
9,829,883 B1    11/2017 Lavoie et al.
(Continued)

FOREIGN PATENT DOCUMENTS

DE    102016224528 A1    6/2018

OTHER PUBLICATIONS

R. Bosch "Smart Trailer Parking—Reversing With Trailer via Smartphone" (Sep. 2013).

*Primary Examiner* — David E Choi
(74) *Attorney, Agent, or Firm* — Frank Lollo; Eversheds Sutherland (US) LLP (57) ABSTRACT

The disclosure generally pertains to a vehicle maneuvering system that includes a personal communication device configured to provide enhanced feedback during vehicle maneuvering operations. In an example scenario, an individual executes a remote-control action upon a personal communication device such as, for example, by swiping a finger across a touchscreen. The personal communication device communicates with a vehicle controller to maneuver the vehicle. Enhanced feedback pertaining to the movement of the vehicle, such as a direction and/or a speed of movement, is provided via the personal communication device in various formats. Some examples include a directional haptic vibration that moves in the personal communication device in correspondence to the movement of the vehicle (and/or a trailer attached to the vehicle), a spatial audio signal that is produced in spatial correspondence with the movement of the vehicle/trailer, and/or an icon that moves spatially on the touchscreen in correspondence with the vehicle/trailer.

18 Claims, 8 Drawing Sheets

(51) Int. Cl.
*G06F 3/04883* (2022.01)
*G06F 3/04817* (2022.01)
*H04M 1/72415* (2021.01)

(52) U.S. Cl.
CPC ...... *G06F 3/04817* (2013.01); *G06F 3/04883* (2013.01); *G08B 6/00* (2013.01); *H04M 1/72415* (2021.01); *G05D 2201/0213* (2013.01)

(56) References Cited

U.S. PATENT DOCUMENTS

| | | | |
|---|---|---|---|
| 10,168,782 B1* | 1/2019 | Tchon | G06F 3/016 |
| 2010/0100256 A1* | 4/2010 | Jurmain | B25J 19/023 |
| | | | 701/2 |
| 2014/0040079 A1* | 2/2014 | Smirin | G06Q 30/0641 |
| | | | 705/27.1 |
| 2014/0249723 A1 | 9/2014 | Pilutti et al. | |
| 2017/0297620 A1 | 10/2017 | Lavoie et al. | |
| 2017/0305462 A1 | 10/2017 | Janardhana et al. | |
| 2018/0356892 A1* | 12/2018 | Shim | G08B 6/00 |
| 2020/0044592 A1* | 2/2020 | Li | H02P 23/0077 |
| 2020/0264006 A1* | 8/2020 | Sommer | H04W 4/029 |
| 2021/0154430 A1* | 5/2021 | Lev | G16H 40/67 |
| 2021/0291832 A1* | 9/2021 | Simmons | B60W 10/20 |
| 2022/0155778 A1* | 5/2022 | Raeis Hosseiny | G05D 1/0022 |

\* cited by examiner

SYSTEMS AND METHODS FOR PROVIDING ENHANCED FEEDBACK ON A PERSONAL COMMUNICATION DEVICE USED FOR VEHICLE MANEUVERING

BACKGROUND

Moving a vehicle in reverse with a trailer in tow can be quite nerve-racking for many drivers. This is particularly true for drivers that are unskilled at backing up vehicles with attached trailers. Such drivers may include those that operate a trailer on an infrequent basis (e.g., drivers that rent a trailer). One challenge that may be faced by a driver when reversing a vehicle with a trailer is the steering wheel input may be counterintuitive to the resulting trailer direction.

Consequently, a person using a handheld device for executing a remote-control vehicle maneuvering operation typically tends to look at the trailer when performing the operation and relies on his/her view of the trailer to assess the progress of the trailer backwards. In some cases, where feasible, the person may stand outside the vehicle to observe the trailer while using the handheld device to control the movement of the vehicle in reverse.

Irrespective of the position in which the person is located, whether inside the vehicle or outside, certain actions may dictate that the person take his/her eyes off the trailer and look at the handheld device. For example, the person may have to look at the handheld device in order to depress a button on the handheld device or to operate an icon on a touchscreen of the handheld device. It is therefore desirable to minimize the amount of time that a person has to look at the handheld device and to maximize the amount of information that can be provided via the handheld device when the person is performing vehicle maneuvering operations.

DESCRIPTION OF THE FIGURES

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The systems and methods disclosed herein generally pertain to a remote-control vehicle maneuvering system that includes a personal communication device configured to provide enhanced feedback during vehicle maneuvering operations. In an example scenario, an individual may execute a remote-control action upon a personal communication device, such as, for example, by swiping a finger across a touchscreen of a smartphone. The personal communication device communicates with a vehicle controller to cause the vehicle to move in a desired way. Enhanced feedback information pertaining to the movement of the vehicle, such as, for example, a direction of movement and/or a speed of motion is provided to the individual in various formats. Some example formats include a directional haptic vibration that moves in the personal communication device in correspondence to the movement of the vehicle (and/or a trailer attached to the vehicle), a spatial audio signal that is produced in the personal communication device in spatial correspondence with the movement of the vehicle (and/or trailer), and/or an icon that moves spatially on the touchscreen in correspondence with the vehicle.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionalities described with respect to a particular device or component may be performed by another device or component. For example, some or all of the functionalities described herein with respect to a personal communication device may, in certain embodiments, be performed by a vehicle controller and/or another component of a vehicle. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art. For example, the word "vehicle" as used in this disclosure can pertain to any one of various types of vehicles, such as, for example, cars, vans, sports utility vehicles, buses, trucks, electric vehicles, gasoline vehicles, hybrid vehicles, and autonomous vehicles. In some cases, the "vehicle" can be a non-powered vehicle, such as a trailer, that is attached to a powered vehicle (a truck, for example).

The phrase "personal communication device" as used herein refers to any of various types of smart devices that can be used by an individual to perform vehicle maneuvering operations. A few examples of personal communication devices can include a cellular phone, a smartphone, a tablet computer, a phablet (phone plus tablet computer), and a portable computer. Such personal communication devices may be used for executing various operations, including remote-control vehicle maneuvering operations from inside or outside a vehicle. The various personal communication devices may communicate with components of a vehicle, such as a vehicle controller, using various communication media and communication formats. For example, a smartphone may communicate with a vehicle controller via a cellular communication link and cellular communications infrastructure (cell towers, repeaters, etc.). As another example, a phablet or a laptop computer may communicate with a vehicle controller via a Bluetooth® communication link.

At least some of the example embodiments described herein are applicable to devices that are neither handheld nor carried upon the person of an individual (a smartwatch, for example). For example, some of the functions and features described herein may be equally applicable to a non-handheld device, such as an infotainment system, mounted in a vehicle. The infotainment system may include various components that provide enhanced feedback, such as, for example, a touchscreen that provides directional haptic vibrations in the manner described herein, an audio system that produces audio spatial audio signals in the manner described herein, and/or a display screen that displays graphics in the manner described herein.

Phrases, such as "remote-control action" and "gesture command," as used herein refer to any of various kinds of actions performed upon a personal communication device. Some examples of such actions can include operating an object (such as a button, a switch, or a joystick), performing touch-related actions upon a touchscreen of a personal communication device, moving the personal communication device in various directions, orienting the personal communication device at various angles, and moving the personal communication device in space at various speeds. Touch-related actions upon a touchscreen can include, for example, applying finger pressure upon a location on the touchscreen, sliding a fingertip (or multiple fingertips) along the touchscreen, scrolling a slider icon, swiping the touchscreen, and flicking the surface of the touchscreen. Any of such actions may be generically referred to in this disclosure by the use of words, such as "swiping" and "sliding." Such words must therefore be interpreted to encompass one or more actions performed for carrying out any remote-control action that is explicitly or implicitly described in this disclosure.

Figure 1:
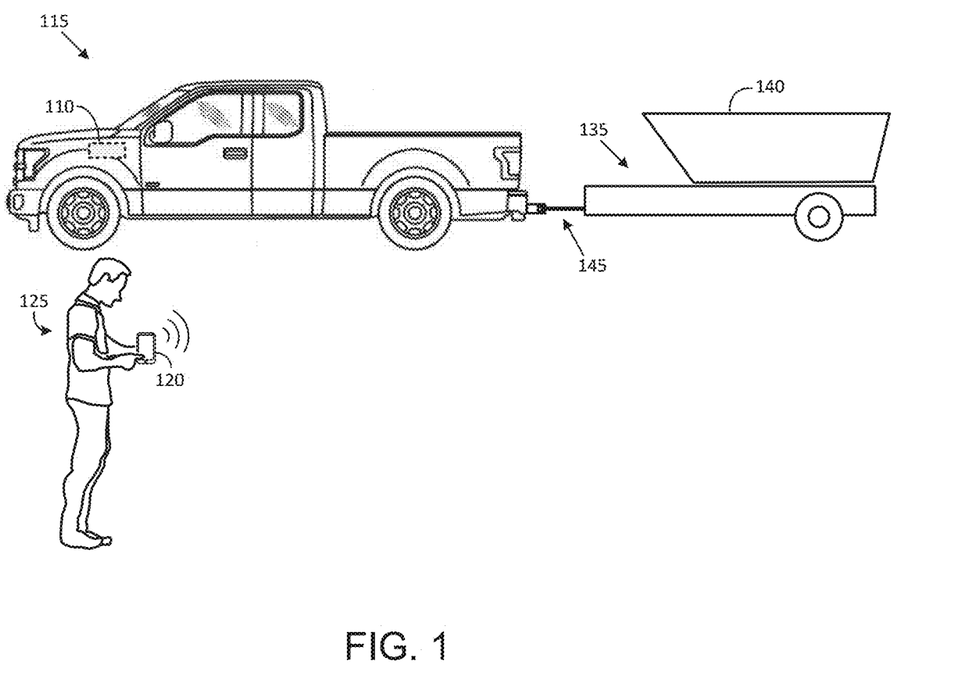
FIG. 1 illustrates a first example scenario of a remote-control vehicle maneuvering operation in accordance with an embodiment of the disclosure.

FIG. 1 illustrates a first example scenario of a remote-control vehicle maneuvering system operation in accordance with an embodiment of the disclosure. In this example scenario, an individual 125 uses a personal communication device 120 to maneuver a vehicle 115 for moving a trailer 135 backwards. The trailer 135 supports a boat 140. The individual 125 may, for example, be moving the trailer 135 in order to launch the boat 140 into a lake, or to park the trailer 135 in a parking spot, for example.

It must be understood that the vehicle 115, though illustrated as a truck, may take the form of any other passenger or commercial automobile, such as, for example, a car, a sport utility, a crossover vehicle, a van, a minivan, a taxi, or a bus, in accordance with the disclosure. Similarly, in other scenarios, the trailer 135 may take the form of a camper, a goods container, a horse trailer, a flatbed, etc., in accordance with the disclosure.

The vehicle 115 may have various types of automotive drive systems in various applications. Example drive systems can include various types of internal combustion engine (ICE) powertrains having a gasoline, diesel, or natural gas-powered combustion engine with conventional drive components, such as, a transmission, a drive shaft, a differential, etc.

In some cases, the vehicle 115 may be configured as an electric vehicle (EV). More particularly, the vehicle 115 may include a battery EV (BEV) drive system. The vehicle 115 may be configured as a hybrid EV (HEV) having an independent onboard power plant or a plug-in HEV (PHEV) that includes a HEV powertrain connectable to an external power source (including a parallel or series hybrid powertrain having a combustion engine power plant and one or more EV drive systems). HEVs can include battery and/or super capacitor banks for power storage, flywheel power storage systems, or other power generation and storage infrastructure.

The vehicle 115 may be further configured as a fuel cell vehicle (FCV) that converts liquid or solid fuel to usable power using a fuel cell, (e.g., a hydrogen fuel cell vehicle (HFCV) powertrain, etc.) and/or any combination of these drive systems and components. Further, in some cases, the vehicle 115 may be a manually driven vehicle, and/or be configured to operate in a fully autonomous or partially autonomous mode.

The trailer 135 is coupled to the vehicle 115 via a hitch 145 such that the vehicle 115 is able to pull or push the trailer 135 from one location to another location. The hitch 145 is configured to allow the trailer 135 to follow a path of the vehicle 115 when the vehicle 115 moves forward. The path of the trailer 135 when the vehicle 115 moves in reverse depends on the direction of force applied by the vehicle 115 at the hitch 145. If the longitudinal axes of the vehicle 115 and trailer 135 are aligned through the hitch 145, the reverse path is straight. If the longitudinal axis of the vehicle 115 and the longitudinal axis of the trailer 135 are at an angle, the reverse path has an angular shape.

The vehicle 115 can include various components, such as a vehicle controller 110, that may be installed in an engine compartment of the vehicle 115 (as schematically illustrated in FIG. 1) or elsewhere in the vehicle 115. The vehicle controller 110 is arranged to cooperate with components of the vehicle 115, such as a fuel injection system and a speed control system, to control various operations of the vehicle 115. Some example functions may include controlling engine operations (fuel injection, speed control, emissions control, braking, etc.), managing climate controls (air conditioning, heating etc.), activating airbags, and issuing warnings (check engine light, bulb failure, low tire pressure, vehicle in blind spot, etc.). In some cases, the vehicle controller 110 may include more than one computer, such as, for example, a first computer that controls engine operations and a second computer that performs actions, such as managing an anti-theft system and/or an infotainment system provided in the vehicle 115.

In one example implementation in accordance with the disclosure, some or all parts of a remote-control vehicle maneuvering system may be incorporated into the vehicle controller 110. In another example implementation in accordance with the disclosure, a remote-control vehicle maneuvering system may be installed in the vehicle 115 in the form of a standalone device that is coupled to other devices, such as the vehicle controller 110, the personal communication device 120, a server computer (via a wireless network), a speaker system of the vehicle 115, and one or more sensors in the vehicle 115. In yet another example implementation in accordance with the disclosure, a remote-control vehicle maneuvering system may be provided in the personal communication device 120 that is configured to communicate with devices, such as the vehicle controller 110, a server computer, and one or more sensors in the vehicle 115.

The movement of the vehicle 115 and trailer 135 may be controlled by an individual 125 in various ways. In a manual mode of operation, the individual 125 may manually control the movement of the vehicle 115 by operating a steering wheel and other components of the vehicle 115, such as an accelerator and a brake.

In another mode of operation in accordance with the disclosure, the individual 125 uses the personal communication device 120 to issue remote-control commands that direct the vehicle controller 110 to move the vehicle backwards at a desired angle and desired direction, for example. In one example application, the personal communication device 120 contains a software application that is launched by the individual 125 by use of a human machine interface (HMI), such as, for example, a touchscreen of the personal communication device 120. The individual 125 then issues remote-control commands by using his/her fingers to initiate remote-control commands upon the touchscreen and/or gesture commands by moving the personal communication device 120 in various ways.

In some situations, the individual 125 may use the personal communication device 120 to issue remote-control commands while seated or standing inside the vehicle 115. In some other situations, the individual 125 may use the personal communication device 120 to issue remote-control commands while standing outside the vehicle 115, as illustrated in FIG. 1. The individual 125 may opt to stand outside the vehicle 115 for various reasons, such as, for example, to have an unrestricted view of the trailer 135 during a backup operation.

The location of the individual 125 (inside or outside the vehicle 115) may be determined by providing any of various devices in the vehicle 115 and/or the trailer 135 so as to enable remote maneuvering of the vehicle 115 in accordance with the disclosure. For example, one or more cameras can be provided in the vehicle 115 for capturing images that are transferred to the vehicle controller 110. A remote-control vehicle maneuvering system that may be a part of the vehicle controller 110 may analyze the images to determine a location of the individual 125 with respect to the vehicle 115 and/or trailer 135.

As another example, the location of the individual may be determined in an indirect manner by identifying a location of the personal communication device 120 that is carried by the individual 125. In this scenario, the vehicle 115 may include one or more wireless communication nodes that are employed by a remote-control vehicle maneuvering system to determine a location of the personal communication device 120 with respect to the vehicle 115. The determination may be made by employing any of various wireless communication technologies, such as Bluetooth®, Ultra-Wideband (UWB), Wi-Fi, Zigbee®, or near-field-communications (NFC), and device locating procedures, such as, for example, a received signal strength indication (RSSI) procedure, a time-of-flight (ToF) trilateration procedure, an Angle-of-Arrival (AoA) procedure, Angle-of-Departure (AoD) procedure, and/or a radio frequency identification (RFID) procedure.

In one example approach, determining the location of the individual 125 indirectly by locating the personal communication device 120 may be carried out by comparing a motion characteristic of the vehicle 115 to a motion characteristic of the personal communication device 120. The motion characteristic of the vehicle 115 may be obtained from one or more sensors attached to the vehicle 115, such as from an accelerometer or a piezo-electric sensor. The motion characteristic of the personal communication device 120 may be obtained from one or more sensors provided in the personal communication device 120, such as, for example, an accelerometer. Comparing the motion characteristic of the vehicle 115 to the motion characteristic of the personal communication device 120 may disclose similarities that indicate that the individual 125 is located inside the vehicle 115, or vice-versa (differences that indicate that the individual 125 is located outside the vehicle 115).

Figure 2:
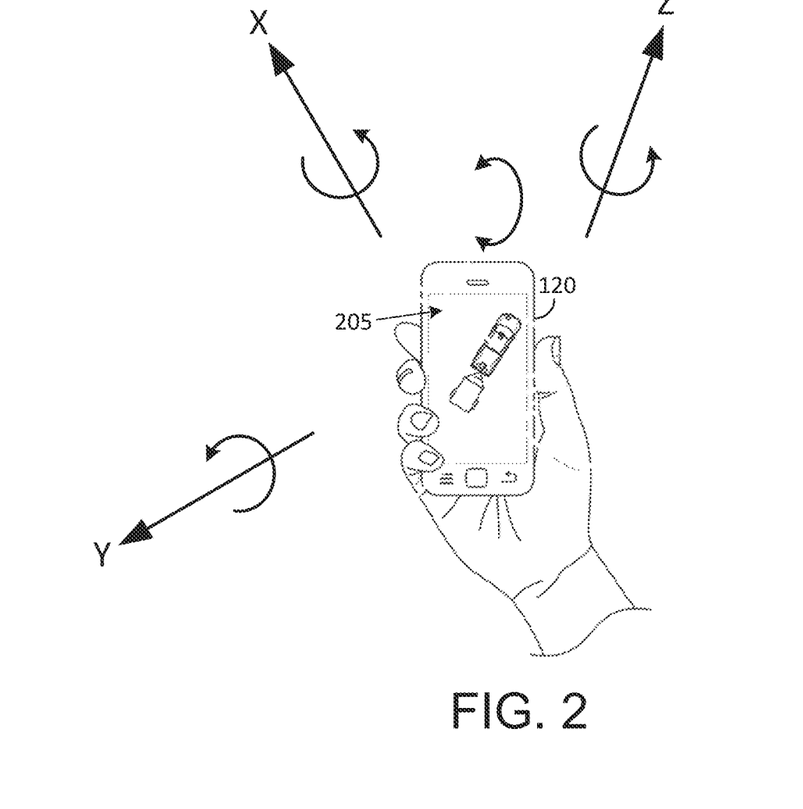
FIG. 2 illustrates some operational features of a personal communication device used for maneuvering a vehicle in accordance with the disclosure.

FIG. 2 illustrates some operational features of the personal communication device 120 used for maneuvering the vehicle 115 in accordance with the disclosure. The personal communication device 120 may include a processor and a computer-readable memory. The memory may be a non-transitory computer-readable memory that stores computer-executable instructions. The computer-executable instructions can be provided in the form of a software application that is executed by the processor to perform at least some operations associated with remote-control vehicle maneuvering in accordance with the disclosure.

When executing these operations, the personal communication device 120 may display various graphical images upon a display screen 205 of the personal communication device 120. The display screen 205 can be a touchscreen that operates as a human machine interface (HMI). In an example scenario, a graphic of the vehicle 115 and the trailer 135 may be displayed upon the display screen 205 and updated in real time during the remote-control vehicle maneuvering operation. The real time graphic can represent a controlled movement of the vehicle 115 and trailer 135 in a forward direction and/or in a reverse direction from a first location to a second location.

Additional graphics, such as icons, buttons, and bars, may be provided on the display screen 205 to allow the individual 125 to enter gesture commands into the personal communication device 120 for maneuvering the vehicle 115. The gesture commands can be used to move the vehicle 115 and the trailer 135 in various directions, at various angles, and at various speeds.

In one example procedure, the individual 125 places both his/her thumbs upon the display screen 205, a touchscreen in this case, and rotates the personal communication device 120 about an axis that is perpendicular to the touchscreen in order to execute a gesture command that directs the vehicle controller 110 to move the vehicle 115 in such a manner as to obtain a desired curvilinear path and/or a desired angular orientation of the trailer 135.

In another example procedure, the individual 125 places both his/her thumbs upon the touchscreen of the personal communication device 120 and tilts the personal communication device 120 about an axis that is horizontal to the touchscreen in order to execute a gesture command that directs the vehicle controller 110 to change the speed of movement of the vehicle 115 when moving backwards. In some cases, the speed of movement of the vehicle 115 may be limited to a preset limit. The preset limit may be determined on the basis of factors, such as safety and maneuverability.

The personal communication device 120 can include various components for detecting gesture commands executed by the individual 125 upon the personal communication device 120, such as by moving the personal communication device 120 in any of various directions with respect to any of various axes. Rotational movements with respect to the x-axis, y-axis, and z-axis are illustrated in FIG. 2.

Figure 3:
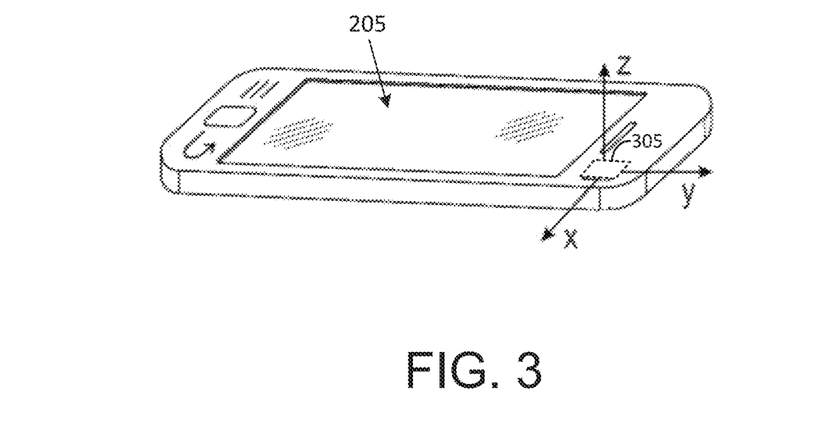
FIG. 3 illustrates some components of a personal communication device that may be used for remote-control vehicle maneuvering operations in accordance with the disclosure.

FIG. 3 illustrates some example components of the personal communication device 120 in accordance with an embodiment of the disclosure. More particularly, in this example illustration, the personal communication device 120 includes the display screen 205 and a sensor in the form of an accelerometer 305. The accelerometer 305 provides sensor signals for use by the remote-control vehicle maneuvering software application. The sensor signals may be processed by the remote-control vehicle maneuvering software application for various reasons, such as, for example, interpreting gesture commands, determining a location of the personal communication device 120, and/or for providing warnings and notifications.

Interpreting gesture commands, such as rotation and tilt, for example, can involve calculations that include applying gravitational acceleration (9.8 meters/sec$^2$) to sensor signal amplitudes and representing the results of the calculations in the form of one or more acceleration vectors. An acceleration vector can indicate a magnitude of gravitational acceleration in a direction toward the surface of the earth. Certain gesture command characteristics can thus be represented in the form of vectors along the x-axis, the y-axis, and/or the z-axis of the personal communication device 120. Other gesture command characteristics may be represented in various other ways, such as, for example, by an angular deviation with respect to an axis. Thus, an angular deviation of 30 degrees with respect to the x-axis may indicate a first amplitude and an angular deviation of 45 degrees with respect to the x-axis may indicate a second amplitude that is greater than the first amplitude.

Figure 4:
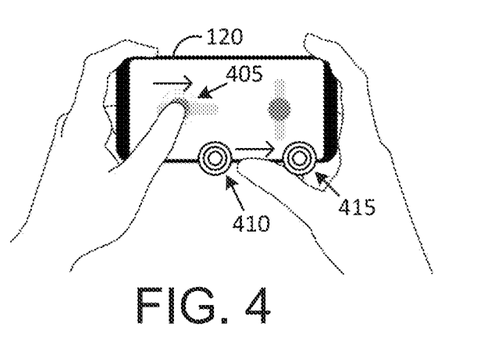
FIG. 4 illustrates a first example of enhanced feedback that may be provided during execution of a remote-control vehicle maneuvering operation in accordance with the disclosure.

FIG. 4 illustrates a first example of enhanced feedback that may be provided during execution of a remote-control vehicle maneuvering operation in accordance with the disclosure. In this example illustration, the personal communication device 120 is a smartphone having a touchscreen display. In other applications, the personal communication device 120 can be any device having a touchscreen, such as, for example, an infotainment device mounted in the vehicle 115. The enhanced feedback that is provided in the personal communication device 120 is a haptic sensation that moves in the personal communication device 120 in correspondence to a direction of movement of the vehicle 115 when responding to a remote-control action performed upon the touchscreen. The remote-control action in this example is placement of a thumb upon a spot 405 on the touchscreen followed by a sliding of the thumb in a desired direction, such as, for example, left to right.

A vibration generator element, such as, for example, a piezo-electric transducer or a motor, produces a vibration in the personal communication device 120 when the thumb is placed upon the touchscreen. The vibration then moves from left to right from the spot 405 in the personal communication device 120, when the thumb is slid on the touchscreen and/or when the vehicle 115 responds to the sliding action. In an example implementation, the vibration may be impressed upon the thumb through the touchscreen. The vibration may also be sensed by the thumb and other fingers of one or both hands through the body of the personal communication device 120. Vibrations transmitted through the body of the personal communication device 120 is illustrated in FIG. 4 by a first vibration spot 410 located in a frame portion of the personal communication device 120 and moving towards the right to a second vibration spot 415 in the frame portion of the personal communication device 120.

The vibration(s) can move in other directions, such as, for example, upwards or downwards. The movement can be along straight paths and/or curved paths in correspondence with a movement of the thumb (or any other finger) upon the touchscreen. Various characteristics of the vibration, such as, for example, a frequency of the vibration and/or an intensity of the vibration may be tailored to match various remote-control actions performed upon the touchscreen. For example, the vibration may be provided at a first frequency when the remote-control action is a finger swipe in a first direction, and provided at a second frequency when the finger is swiped in a different direction.

In some cases, the vibration frequency can be an audible frequency that is not only felt through the personal communication device 120 but also heard by the individual 125 who is performing the remote-control action. As another example, an intensity of the vibration may be varied in accordance with finger pressure, such as, for example, a higher intensity in response to greater finger pressure and vice-versa. In some applications, the intensity of the directional haptic vibration may reach a peak intensity when the thumb or finger of the individual 125 reaches a limit of movement upon the touchscreen of the personal communication device 120. The limit of movement can be defined by the dimensions of the personal communication device 120 and/or by constraints related to the operation of the vehicle 115 (such as for example a speed limitation or a turn radius limitation of the vehicle 115).

Furthermore, certain characteristics of the vibration, such as, for example, an intensity level of the vibration may vary over time in correspondence to certain operations of the vehicle 115. For example, the vibration may have a first intensity when the vehicle 115 is traveling at a certain speed at a first instant in time and a second intensity when the vehicle 115 is traveling at a different speed at a different moment in time.

Figure 5:
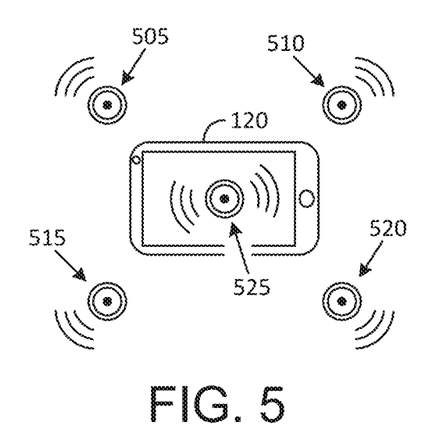
FIG. 5 illustrates a second example of enhanced feedback that may be provided during execution of a remote-control vehicle maneuvering operation in accordance with the disclosure.

FIG. 5 illustrates a second example of enhanced feedback that may be provided during execution of a remote-control vehicle maneuvering operation in accordance with the disclosure. In this example illustration, the personal communication device 120 is a smartphone having a touchscreen display. In other applications, the personal communication device 120 can be any device that includes a sound reproduction system, such as, for example, an infotainment device mounted in the vehicle 115. The enhanced feedback that is provided in the personal communication device 120 is a spatial audio signal that is produced by the personal communication device 120 in spatial correspondence with a direction of movement of the vehicle 115 when responding to a remote-control action performed upon the touchscreen. The remote-control action in this example can be the placement of a thumb upon a spot on the touchscreen followed by a sliding of the thumb in a desired direction (such as for example, left to right).

An audio system that may include an audio amplifier and a sound reproduction system can be used to produce the spatial audio signal in spatial correspondence with the direction of movement of the vehicle 115. In implementations where the personal communication device 120 is a smartphone, the audio amplifier as well as the speakers of the sound reproduction system may be built into the smartphone. In implementations where the personal communication device 120 is an infotainment system of the vehicle 115, the audio amplifier may be located inside a dashboard-mounted unit that includes a touchscreen. The sound reproduction system in this case can include two or more speakers that are located in the cabin area of the vehicle 115 and arranged to broadcast the spatial audio signal produced by the audio amplifier in the dashboard-mounted unit.

In an example embodiment in accordance with the disclosure, an audio system used for producing the spatial audio signal can include hardware and software similar to that used for producing multi-channel sounds, such as, for example, stereophonic sound, quadrophonic sounds, surround sound, and various types of Dolby® system sounds, such as, for example, Dolby® Atmos. Dolby® Atmos technology creates virtualized, immersive audio that creates a realistic perception of height and surround sound. In two-channel audio systems, head-related transfer functions (HRTFs) can be used for defining how incoming sounds located at different locations around a listener can arrive at the ears of the listener. Some sounds may reach one ear at a slightly different time than the other ear, thereby producing a spatial acoustic characteristic that is perceived by the brain of the listener as three-dimensional (3D) sound. HTRFs constitute a mathematical representation that may be used to produce 3D sound.

Certain types of speaker arrangements may create a natural "crosstalk" phenomenon in a listener's ears. The crosstalk phenomenon in a listener's ears tends to work against simulating multiple channels. However, a Dolby® Atmos processor can cancel this crosstalk by applying HRTFs and recreate a dimensional soundstage and movement of audio objects. A streaming-media Dolby® Atmos audio mix supports up to 128 simultaneous audio objects and includes metadata that describes the location of each audio object in space. A Dolby® Atmos processor may apply HRTFs to the metadata to recreate spatial information into a stereo soundtrack. The stereo soundtrack accurately simulates theatrical sounds, including sounds from several sides, for a spacious experience. A Dolby® Surround sound system is illustrated in FIG. 5 in the form of five virtual surround sound speakers. The five virtual surround speakers include a top left virtual speaker 505, a top right virtual speaker 510, a bottom left virtual speaker 515, a bottom right virtual speaker 520, and a virtual center speaker 525 (sub-woofer).

The spatial audio signal produced in accordance with the disclosure can offer to a listener, directional and/or location information pertaining to the vehicle 115. For example, the spatial audio signal may simulate a vehicle engine sound moving from left to right when a thumb of the individual 125 is placed upon the touchscreen of the personal communication device 120 and swiped from left to right. The spatial audio signal in the form of the vehicle engine sound (or any other sound) may move in various other directions to simulate vehicle engine sounds when the vehicle 115 is moving in these various directions. The vehicle engine sound may also be modified in accordance with typical vehicle engine sounds associated with actions, such as turning, braking, accelerating, braking, and shifting gears.

Various qualities of the spatial audio signal, such as, for example, a sound intensity, may vary over time in correspondence to certain operations of the vehicle 115. For example, the spatial audio signal may have a first intensity when the vehicle 115 is traveling at a certain speed at a first instant in time and a second intensity when the vehicle 115 is traveling at a different speed at a different moment in time.

In some applications in accordance with the disclosure, the spatial audio signal may be combined with the haptic sensation (vibration) described above with respect to FIG. 4. Such a combination can offer enhanced feedback that is discernible through the fingers as well as through the ears of the individual 125 when remote-control operations are performed upon the personal communication device 120 for execution by the vehicle 115.

Figure 6:
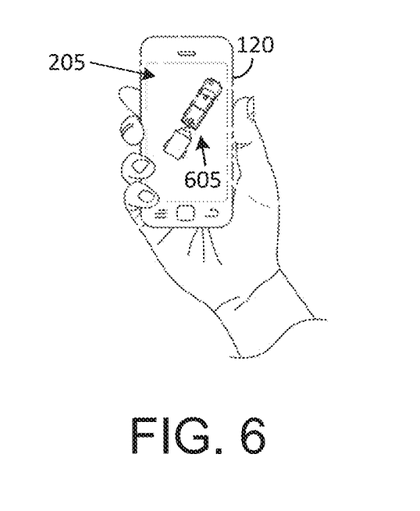
FIG. 6 illustrates a third example of enhanced feedback that may be provided during execution of a remote-control vehicle maneuvering operation in accordance with the disclosure.

FIG. 6 illustrates a third example of enhanced feedback that may be provided during execution of a remote-control vehicle maneuvering operation in accordance with the disclosure. In this example illustration, the personal communication device 120 is a smartphone having a touchscreen display. In other applications, the personal communication device 120 can be any device that includes a display screen, such as, for example, an infotainment device mounted in the vehicle 115.

The enhanced feedback that is provided in the personal communication device 120 can be an icon 605 that moves in spatial correspondence with a direction of movement of the vehicle 115 when responding to a remote-control action performed upon the touchscreen. The remote-control action in this example can be a sliding of the thumb in a desired direction, such as for example, left to right. The icon 605, which in this example is a graphical representation of the vehicle 115 with trailer 135 attached, moves from left to right correspondingly. The graphical representation is dynamically updated as the vehicle 115 moves in response to one or more remote-control actions performed upon the personal communication device 120. Furthermore, in accordance with an embodiment of the disclosure, the movement of the icon 605 upon the display screen of the personal communication device 120 is synchronized to other enhanced feedback features, such as, for example, the directional haptic vibration and the spatial audio signal, so as to cooperatively offer a holistic enhanced feedback to an operator of the personal communication device 120.

Figure 7:
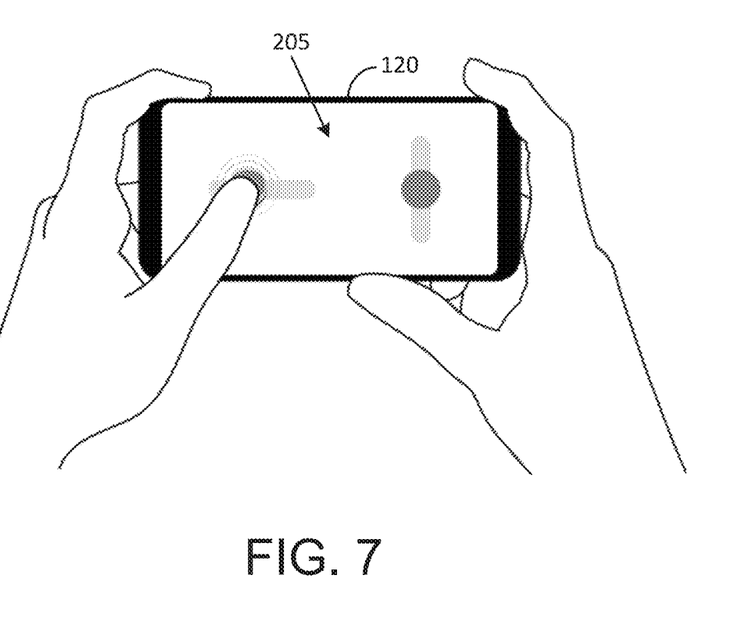
FIG. 7 illustrates a view of a display screen of a personal communication device in a first example implementation in accordance with the disclosure.

FIG. 7 illustrates a view of the display screen 205 of the personal communication device 120 in a first example implementation in accordance with the disclosure. The remote-control action associated with this implementation may involve touch-related actions performed upon the display screen 205 and/or gesture commands (such as, for example, rotating the personal communication device 120 about one or more axes in the manner described above with respect to FIG. 2).

A gesture command may be carried out, for example, to move the trailer 135 in a desired direction at a desired angle. The personal communication device 120 provides enhanced feedback in one or more ways as described above (directional haptic vibration, spatial audio signal, and/or graphical representation) during the procedure. The directional haptic vibration may, for example, pan across the display screen 205 to track the movement of the vehicle 115. If the trailer 135 is moving along a curved path towards the right, a right side of the personal communication device 120 may vibrate and an intensity of the vibration may vary in accordance with the nature of the movement of the trailer 135. The directional haptic vibration may be particularly useful when the steering system of the vehicle 115 moves in one direction in order to steer the trailer 135 in a different direction.

Figure 8:
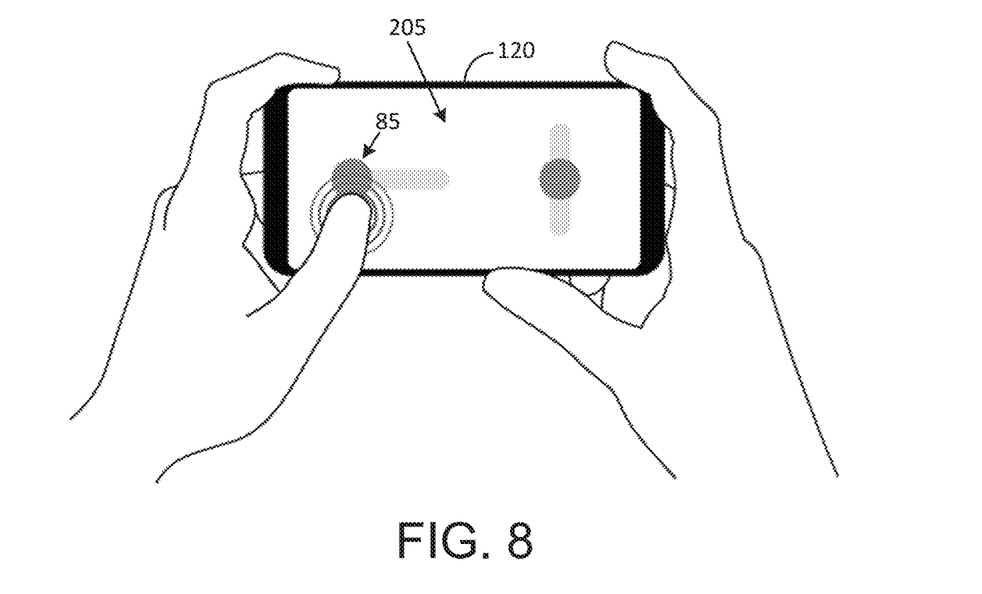
FIG. 8 illustrates a view of a display screen of a personal communication device in an example scenario when executing a remote-control action in accordance the disclosure.

In some implementations, a first vibration waveform pattern (for example, a high frequency signal having high amplitude) may be used to communicate system critical feedback, whereas a second vibration pattern (mild vibrations with varying phase) may be used to communicate non-critical feedback. In addition to this, a strong haptic pattern can be used to produce a vibration if a finger of the individual 125 has slipped away from an icon 85 on the display screen 205 (as illustrated in FIG. 8), when performing a remote-control action.

User interaction with the personal communication device 120, coupled with the enhanced feedback described herein, may minimize a tendency on the part of the individual 125 to take his/her eyes off the vehicle 115 or trailer 135 to look at the display screen 205, during a remote-controlled vehicle maneuvering operation.

Figure 9:
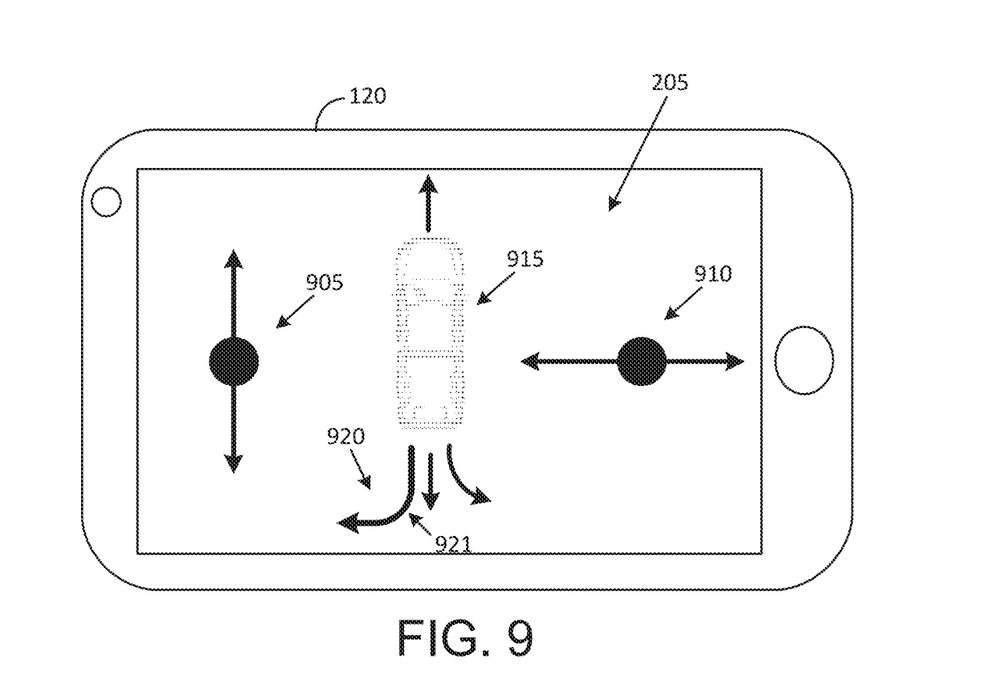
FIG. 9 illustrates a view of a display screen of a personal communication device in a second example implementation in accordance with the disclosure.

FIG. 9 illustrates a view of the display screen 205 of the personal communication device 120 in a second example implementation in accordance with the disclosure. The remote-control action associated with this implementation can involve the individual 125 placing a left thumb upon a slider button icon of a slider 905 to command the vehicle 115 to move either forwards or backwards. The right thumb of the individual 125 may be placed upon a slider button icon of the slider 910 to command the vehicle 115 to turn either left or right.

In one example operation, the individual 125 may operate both slider button icons to move the vehicle 115 backwards and then turn towards the left (as indicated by arrow 920) left. The personal communication device 120 may produce a directional haptic vibration on the display screen 205 that moves backwards and then towards the left in correspondence to the movement of the vehicle 115. An intensity of the directional haptic vibration may vary in accordance with the radius of the turn 921. Accordingly, a tighter turn radius may be accompanied by a higher intensity vibration than a vibration associated with a wide turn radius. In some applications, the directional haptic vibration may be accompanied by a spatial audio signal that emanates from the virtual speakers (described above) and/or an icon 915 that moves on the display screen 205 in correspondence with the movement of the vehicle 115 and synchronized to the directional haptic vibration and the spatial audio signal.

Figure 10:
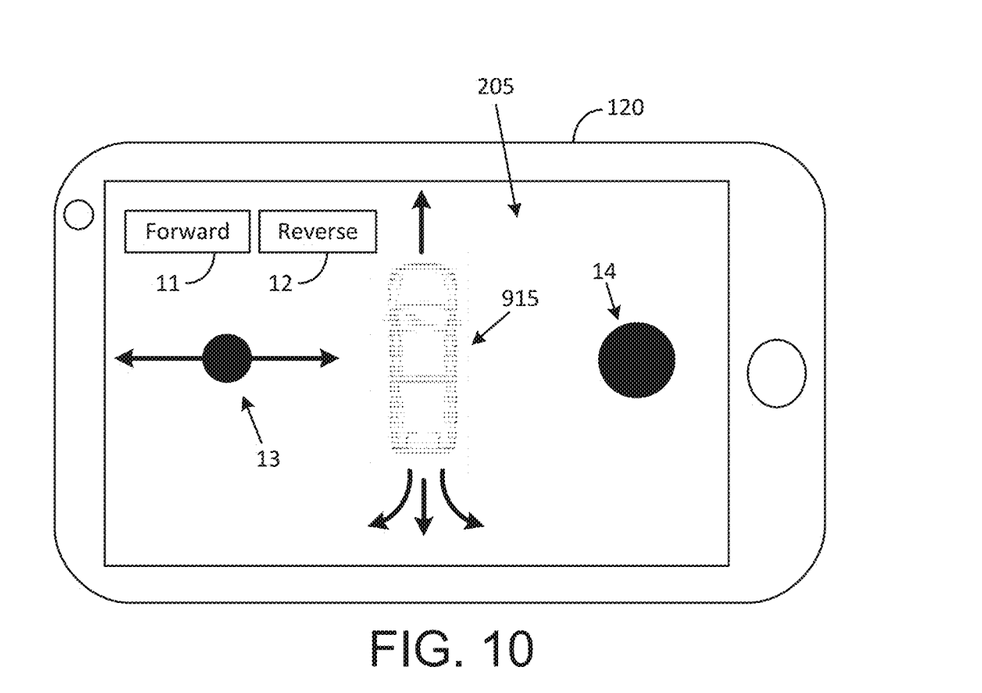
FIG. 10 illustrates a view of a display screen of a personal communication device in a third example implementation in accordance with the disclosure.

FIG. 10 illustrates a view of the display screen 205 of the personal communication device 120 in a third example implementation in accordance with the disclosure. The remote-control action associated with this implementation can involve the individual 125 depressing either the forward icon 11 or the reverse icon 12 and using his/her right thumb placed upon the button icon 14 to control the selected forward or reverse movement of the vehicle 115 at a desired speed. A left thumb of the individual 125 may be used to operate a slider button icon on a slider 13 to command the vehicle 115 to turn either left or right.

The vehicle 115 may also be controlled by using gesture commands upon the personal communication device 120 (tilting the personal communication device 120 in various ways). The remote-control operations performed upon the personal communication device 120 may be accompanied by enhanced feedback, such as the directional haptic vibration, the spatial audio signal, and/or movement of the icon 915 upon the display screen 205 in the manner described above.

Figure 11:
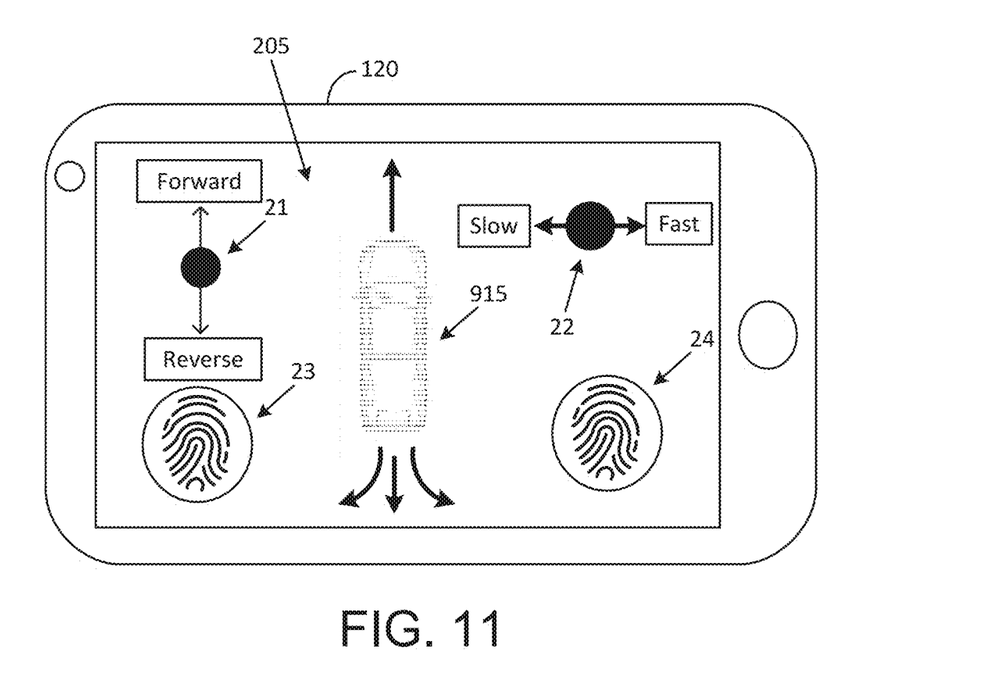
FIG. 11 illustrates a view of a display screen of a personal communication device in a fourth example implementation in accordance with the disclosure.

FIG. 11 illustrates a view of the display screen 205 of the personal communication device 120 in a fourth example implementation in accordance with the disclosure. The remote-control action associated with this implementation can involve the individual 125 using his/her left thumb to move a slider button on a slider 21 for selecting either a forward movement condition or a reverse movement condition for the vehicle 115. The individual 125 may use his/her right thumb to move a slider icon on a slider 22 to vary a speed of the vehicle 115.

The individual 125 may then place his/her left thumb upon the thumb icon 23 and his/her right thumb upon the thumb icon 24 to steer the vehicle 115 by use of gesture commands, such as tilting the personal communication device 120 is various ways. The remote-control operations performed upon the personal communication device 120 may be accompanied by enhanced feedback, such as the directional haptic vibration, the spatial audio signal, and/or movement of the icon 915 upon the display screen 205 in the manner described above. The directional haptic vibration may be transmitted through the display screen 205 into one or both thumbs of the individual 125 and/or through the frame of the personal communication device 120.

Figure 12:
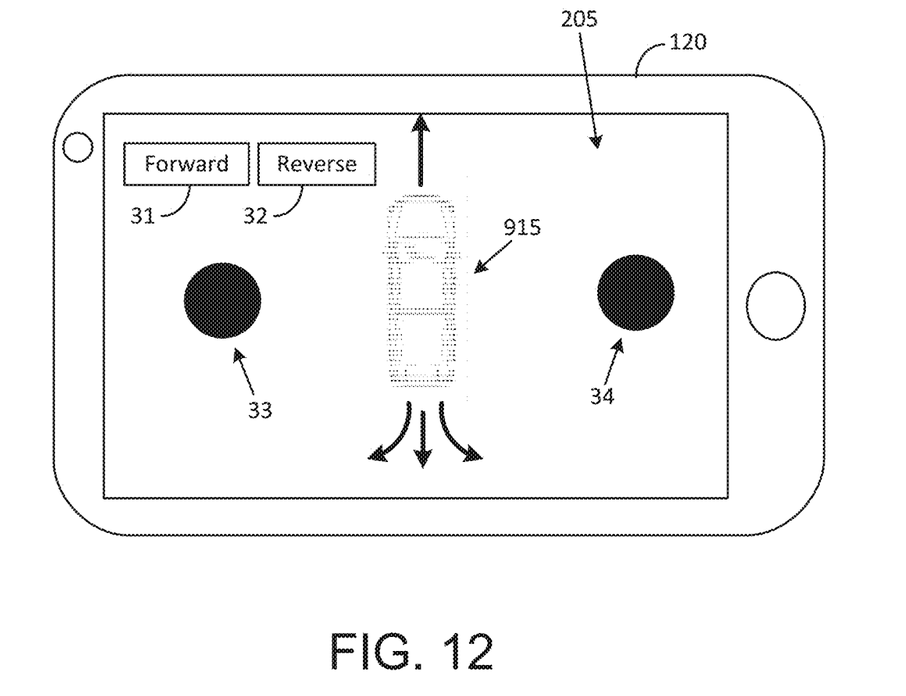
FIG. 12 illustrates a view of a display screen of a personal communication device in a fifth example implementation in accordance with the disclosure.

FIG. 12 illustrates a view of the display screen 205 of the personal communication device 120 in a fifth example implementation in accordance with the disclosure. The remote-control action associated with this implementation can involve the individual 125 depressing either the forward icon 31 or the reverse icon 32, followed by placing his/her left thumb upon the thumb icon 33 and right thumb upon the thumb icon 34 to steer the vehicle 115. The steering may be carried out by gesture commands, such as by tilting the personal communication device 120 is various ways. The remote-control operations performed upon the personal communication device 120 may be accompanied by enhanced feedback, such as the directional haptic vibration, the spatial audio signal, and/or movement of the icon 915 upon the display screen 205 in the manner described above. The directional haptic vibration may be transmitted through the display screen 205 into one or both thumbs of the individual 125 and/or through the frame of the personal communication device 120.

Figure 13:
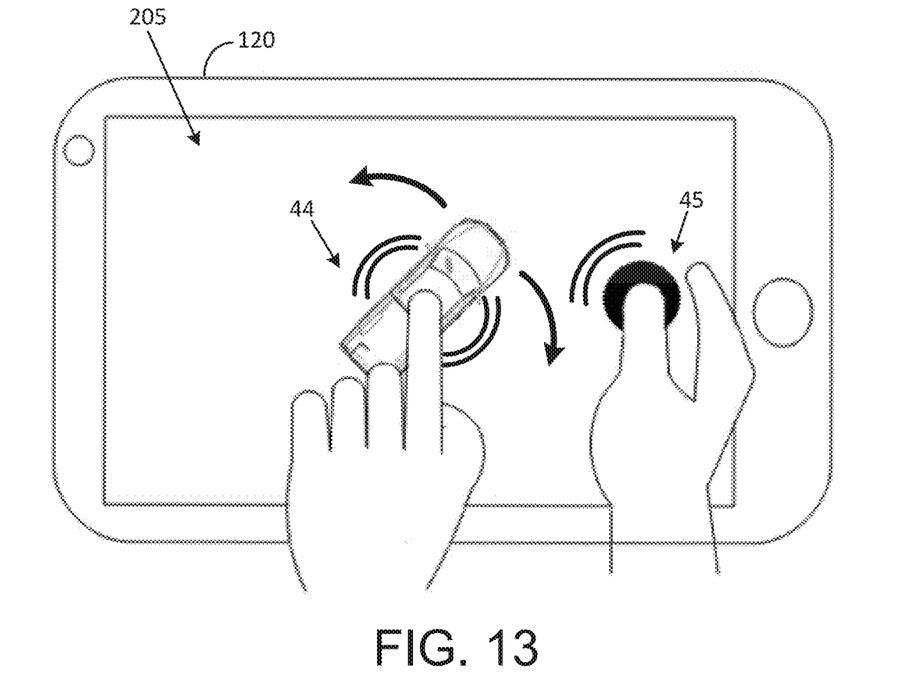
FIG. 13 illustrates a view of a display screen of a personal communication device in a sixth example implementation in accordance with the disclosure.

FIG. 13 illustrates a view of the display screen 205 of the personal communication device 120 in a sixth example implementation in accordance with the disclosure. The remote-control action associated with this implementation can involve the individual 125 placing his/her left thumb upon the vehicle icon 44 to vary a direction of movement of the vehicle 115 (and/or the trailer 135 when the trailer 135 is attached to the vehicle 115). The individual 125 may use his/her right thumb and the icon 45 to initiate movement of the vehicle and to vary the speed of the vehicle 115.

Figure 14:
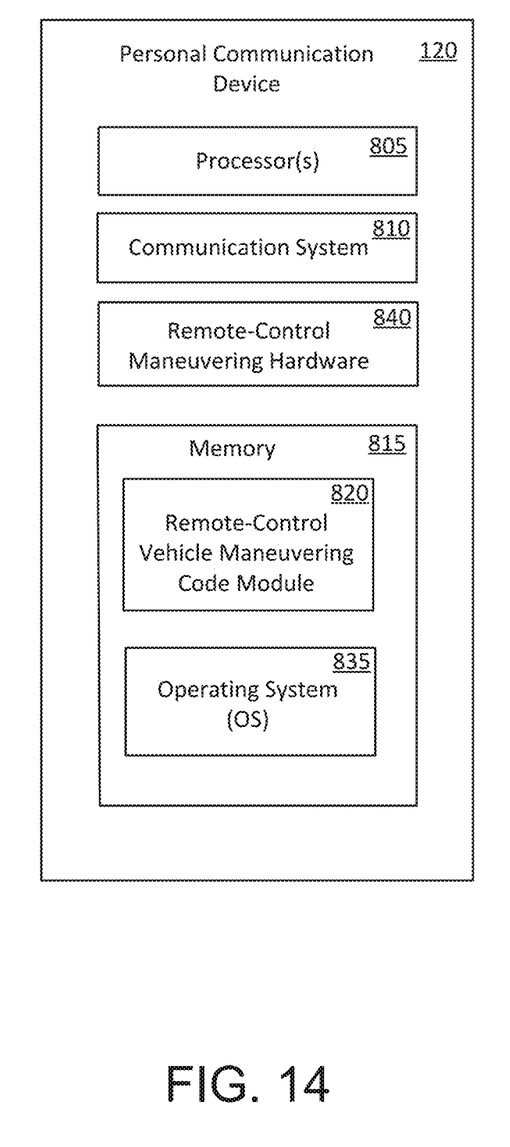
FIG. 14 illustrates some example components that may be included in a personal communication device configured for executing remote-control vehicle maneuvering operations in accordance with an embodiment of the disclosure.

FIG. 14 illustrates some example components that may be included in the personal communication device 120 in accordance with an embodiment of the disclosure. The personal communication device 120 may include a processor 805, a wireless communication system 810, remote-control maneuvering hardware 840, and a memory 815. The memory 815 can be a non-transitory computer-readable memory that stores computer-executable instructions. The computer-executable instructions can be provided in the form of a software application that is executed by the processor 805 to perform at least some operations associated with various functions provided by the personal communication device 120, particularly functions pertaining to remote-control vehicle maneuvering in accordance with the disclosure. The various functions provided by the personal communication device 120 can depend on the nature of the personal communication device 120. Thus, when the personal communication device 120 is a smartphone, for example, the various functions can include phone calls, text messages, and browser-related activities. As another example, when the personal communication device 120 is an infotainment system of the vehicle 115, the various functions can include music, video, navigation assistance, vehicle security, and phone calls.

The wireless communication system 810 may be configured to provide wireless communications between the personal communication device 120 and various objects, such as, for example, the vehicle controller 110 of the vehicle 115 and/or a server computer. The remote-control maneuvering hardware 840 may enable the personal communications device 120 to be used for vehicle maneuvering operations including the various operations described herein in accordance with the disclosure.

The memory 815 can include an operating system (OS) 835 and a remote-control vehicle maneuvering code module 820. The remote-control vehicle maneuvering code module 820 can be executed by the processor 805 for performing various operations described herein in accordance with the disclosure. For example, the remote-control vehicle maneuvering code module 820 can be executed by the processor 805 for displaying various objects, such as icons and images upon the display screen 205 of the personal communications device 120. The icons and images may be associated with a human machine interface (HMI) for performing vehicle maneuvering operations. The individual 125 can issue remote-control commands by using his/her fingers to initiate remote-control commands via the HMI. The remote-control vehicle maneuvering code module 820 can also be executed by the processor 805 for generating enhanced feedback in the personal communications device 120, such as, for example, a directional haptic vibration, a spatial audio signal, and/or a graphical representation that is synchronized to the directional haptic vibration and/or the spatial audio signal.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions, such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device, such as a memory provided in the personal communication device 120 can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, personal communication devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
   executing a vehicle maneuver by performing a remote-control action upon a personal communication device; and
   generating a feedback in the personal communication device, the feedback comprising a haptic sensation that moves in the personal communication device in correspondence to a direction of movement of a vehicle responding to the remote-control action,
   wherein an intensity of the haptic sensation varies in accordance with a speed of the vehicle, and wherein the remote-control action comprises a first swipe of a finger in a first direction upon a touchscreen of the personal communication device, and
   wherein the intensity of the haptic sensation reaches a peak intensity when the finger reaches a limit of movement upon the touchscreen of the personal communication device.

2. The method of claim 1, wherein the remote-control action comprises a first swipe of a finger upon a touchscreen of the personal communication device, wherein the vehicle moves in a first direction in response to the first swipe, and wherein the haptic sensation comprises a vibration that moves in the first direction in the personal communication device.

3. The method of claim 2, wherein an intensity of the vibration varies in correspondence with a speed of movement of the vehicle.

4. The method of claim 2, wherein the remote-control action further comprises a second swipe of the finger upon the touchscreen of the personal communication device, wherein the vehicle moves in a second direction in response to the second swipe, and wherein the haptic sensation comprises the vibration moving in the second direction in the personal communication device.

5. The method of claim 4, wherein the vibration occurs at a first frequency when the vehicle is moving in the first direction and at a second frequency when the vehicle is moving in the second direction.

6. The method of claim 1, wherein the feedback further comprises a spatial audio signal and/or an icon, wherein the spatial audio signal is produced in the personal communication device in spatial correspondence with the direction of movement of the vehicle, and wherein the icon moves spatially on a display screen of the personal communication device in correspondence with the direction of movement of the vehicle.

7. A method comprising:
   performing a remote-control action upon a personal communication device to maneuver a vehicle in a first direction; and
   generating a feedback in the personal communication device, the feedback comprising at least one of a directional haptic vibration that moves in the first direction in the personal communication device or a spatial audio signal that is produced by the personal communication device in spatial correspondence with the first direction wherein an intensity of the spatial audio signal varies in accordance with a speed of the vehicle.

8. The method of claim 7, wherein an intensity of the directional haptic vibration varies in accordance with a speed of the vehicle when the vehicle is moving in the first direction.

9. The method of claim 8, wherein the remote-control action comprises a first swipe of a finger in the first direction upon a touchscreen of the personal communication device, and wherein the intensity of the directional haptic vibration reaches a peak intensity when the finger reaches a limit of movement upon the touchscreen of the personal communication device.

10. The method of claim 7, wherein the remote-control action comprises a first swipe of a finger in the first direction upon a touchscreen of the personal communication device and the method further comprises a second swipe of the finger in a second direction to direct the vehicle to move in the second direction, and wherein the directional haptic vibration occurs at a first frequency when the vehicle is moving in the first direction and at a second frequency when the vehicle is moving in the second direction.

11. The method of claim 7, wherein the feedback further comprises an icon that moves spatially on a display screen of the personal communication device in correspondence with a direction of movement of the vehicle.

12. The method of claim 11, wherein the vehicle is an automobile or a trailer attached to the automobile and the icon is a graphical representation of the automobile or the trailer.

13. A personal communication device comprising:
a touchscreen;
a vibration generator;
an audio system;
a memory that stores computer-executable instructions; and
a processor configured to access the memory and execute the computer-executable instructions to at least:
  detect a vehicle maneuvering action performed upon the touchscreen;
  determine that the vehicle maneuvering action is associated with moving a vehicle in a first direction;
  transmit a first command to move the vehicle in the first direction;
  receive from the vehicle, movement information that includes a first confirmation that the vehicle is moving in the first direction; and
  generate a feedback in the personal communication device, the feedback comprising operating the vibration generator to generate a directional haptic vibration that moves in the first direction and/or operating the audio system to generate a spatial audio signal in spatial correspondence with the first direction;
  determine, from the movement information received from the vehicle, a first speed of the vehicle at a first instant in time and a second speed of the vehicle at a second instant in time; and
  set an intensity of the directional haptic vibration to a first level at the first instant in time and to a second level at the second instant in time.

14. The personal communication device of claim 13, wherein the vehicle maneuvering action is further associated with moving the vehicle in a second direction, and wherein the processor is further configured to access the memory and execute the computer-executable instructions to:
  generate the directional haptic vibration at a first frequency when the vehicle is moving in the first direction and at a second frequency when the vehicle is moving in the second direction.

15. The personal communication device of claim 13, wherein the processor is further configured to access the memory and execute the computer-executable instructions to:
  generate an icon that moves spatially on the touchscreen in correspondence with the vehicle.

16. The personal communication device of claim 15, wherein a movement of the icon reflects a path of travel of the vehicle, a direction of travel of the vehicle, and/or a speed of travel of the vehicle.

17. The personal communication device of claim 13, wherein the vibration generator comprises a piezo-electric transducer, wherein the audio system comprises an audio circuit that generates spatial audio, and wherein the vehicle maneuvering action comprises a first swipe of a finger upon the touchscreen of the personal communication device.

18. The personal communication device of claim 17, wherein the processor is further configured to access the memory and execute the computer-executable instructions to:
  generate the directional haptic vibration at a first frequency when the vehicle is moving in the first direction;
  detect a second swipe of the finger upon the touchscreen as a part of the vehicle maneuvering action;
  determine that the second swipe in in a second direction;
  transmit a second command to move the vehicle in the second direction;
  receive from the vehicle, movement information that includes a second confirmation that the vehicle is moving in the second direction; and
  generate the directional haptic vibration at a second frequency when the vehicle is moving in the second direction.

* * * * *